US008362146B2

(12) United States Patent
Eipper et al.

(10) Patent No.: US 8,362,146 B2
(45) Date of Patent: *Jan. 29, 2013

(54) IMPACT-MODIFIED POLYESTERS WITH HYPERBRANCHED POLYESTERS/POLYCARBONATES

(75) Inventors: Andreas Eipper, Ludwigshafen (DE); Bernd Bruchmann, Freinsheim (DE); Carsten Weiβ, Ludwigshafen (DE); Jean-Francois Stumbe, Strasbourg (FR)

(73) Assignee: BASF SE, Ludwigshafen (DE)

( * ) Notice: Subject to any disclaimer, the term of this patent is extended or adjusted under 35 U.S.C. 154(b) by 24 days.

This patent is subject to a terminal disclaimer.

(21) Appl. No.: 11/659,506

(22) PCT Filed: Aug. 2, 2005

(86) PCT No.: PCT/EP2005/008339
§ 371 (c)(1),
(2), (4) Date: Feb. 6, 2007

(87) PCT Pub. No.: WO2006/018127
PCT Pub. Date: Feb. 23, 2006

(65) Prior Publication Data
US 2007/0244227 A1 Oct. 18, 2007

(30) Foreign Application Priority Data
Aug. 10, 2004 (DE) .................. 10 2004 038 979

(51) Int. Cl.
*C08G 63/48* (2006.01)
(52) U.S. Cl. .......... 525/67; 524/409; 524/100; 524/126; 524/133; 524/147; 252/601
(58) Field of Classification Search .................. 524/100
See application file for complete search history.

(56) References Cited

U.S. PATENT DOCUMENTS

| | | | |
|---|---|---|---|
| 3,305,605 A | 2/1967 | Hostettler et al. | |
| 3,479,314 A | 11/1969 | Williams | |
| 3,491,048 A | 1/1970 | Sargent | |
| 4,002,581 A | 1/1977 | Dolce | |
| 4,164,114 A | 8/1979 | Yabuki et al. | |
| 4,239,677 A | 12/1980 | Dieck | |
| 4,351,916 A | 9/1982 | Kohan | |
| 4,396,742 A | 8/1983 | Binsack et al. | |
| 4,771,109 A | 9/1988 | Eichenauer et al. | |
| 4,873,289 A | 10/1989 | Linder et al. | |
| 4,882,381 A | 11/1989 | Wittman et al. | |
| 5,010,135 A | 4/1991 | Eckel et al. | |
| 5,136,014 A | 8/1992 | Figuly | |
| 5,144,005 A | 9/1992 | Sextro et al. | |
| 5,157,076 A * | 10/1992 | Greenlee et al. | 525/83 |
| 5,250,595 A | 10/1993 | Miyashita et al. | |
| 5,314,949 A | 5/1994 | Kozakura et al. | |
| 5,348,699 A | 9/1994 | Meyer et al. | |
| 5,399,620 A | 3/1995 | Niessner et al. | |
| 5,480,944 A | 1/1996 | Aharoni | |
| 5,496,887 A | 3/1996 | Braune | |
| 5,608,030 A | 3/1997 | Hoffmockel et al. | |
| 5,621,031 A | 4/1997 | Leimann et al. | |
| 5,712,336 A * | 1/1998 | Gareiss et al. | 524/373 |
| 5,844,059 A | 12/1998 | Yamamoto et al. | |
| 5,998,565 A | 12/1999 | de Brabander-van den Berg et al. | |
| 6,037,444 A | 3/2000 | Rannard et al. | |
| 6,087,449 A | 7/2000 | Tiefensee et al. | |
| 6,225,404 B1 | 5/2001 | Sorensen et al. | |
| 6,232,435 B1 | 5/2001 | Heitz et al. | |
| 6,252,025 B1 | 6/2001 | Wang et al. | |
| 6,262,185 B1 | 7/2001 | Heitz et al. | |
| 6,300,424 B1 | 10/2001 | Frechet et al. | |
| 6,497,959 B1 | 12/2002 | Mhetar | |
| 6,528,612 B1 * | 3/2003 | Brenner et al. | 528/271 |
| 6,541,599 B1 | 4/2003 | Wang | |
| 6,894,112 B1 | 5/2005 | Weber et al. | |
| 7,081,509 B2 | 7/2006 | Wagner et al. | |
| 2002/0120076 A1 | 8/2002 | Schueler et al. | |
| 2002/0161113 A1 * | 10/2002 | Dvornic et al. | 525/100 |
| 2003/0018104 A1 | 1/2003 | Mours et al. | |
| 2003/0069370 A1 | 4/2003 | Dvornic et al. | |

(Continued)

FOREIGN PATENT DOCUMENTS
BE 702357 2/1968
BE 720658 11/1969

(Continued)

OTHER PUBLICATIONS

1992, Becker/Braun, Kunststoff-Handbuch Bd. 3, Polycarbonate, Polyacetale, Polyester, Celluloseester, Carl-Hanser-Verlag, München 1992, Seiten 118-119.
Nov. 29, 2000, S.P. Rannard u. H. J. Davis, J. Am. Chem. Soc. 2000, 122, 11729.
Apr. 17, 1997, D. H. Bolton u. K.L. Wooley, Macromolecules 1997, 30, 1890.
K. Pochner, et al., Treatment of Polymers for subsequent metallization using intense UV radiation or plasma at atmospheric pressure, 1997, 372-377, Surface and Coatings Technology 97.
A. Weber, et al., Metallization of Polymers Using Plasma-Enhanced Chemical Vapor Deposited Titanium Nitride as Interlayer, Mar. 1997, 1131-1135, Journal of the Electrochemical Society, vol. 14, No. 3.
H. Horn, et al., Excimer laser pretreatment and metallization of polymers, 1999, 270-284, Nuclear Instruments and Methods in Physics Research B151.
Massa, et al., "Novel Blends of Hyperbranched Polyesters and Linear polymers", *Macromolecules* (1995), pp. 3214-3220, vol. 28, No. 9.
Gorda, et al., "Star Shaped Condensation Polymers: Synthesis, Characterization, and Blend Properties", Journal of Applied Polymer Science (1993), pp. 1977-1983, vol. 50.

(Continued)

*Primary Examiner* — Doris Lee
(74) *Attorney, Agent, or Firm* — Connolly Bove Lodge & Hutz LLP

(57) ABSTRACT

Thermoplastic molding compositions, comprising
A) from 10 to 98% by weight of at least one thermoplastic polyester,
B) from 0.01 to 50% by weight of
B1) at least one highly branched or hyperbranched polycarbonate with an OH number of from 1 to 600 mg KOH/g of polycarbonate (to DIN 53240, Part 2), or
B2) at least one highly branched or hyperbranched polyester of $A_xB_y$ type, where x is at least 1.1 and y is at least 2.1, or a mixture of these,
C) from 1 to 40% by weight of an impact-modifying polymer,
D) from 0 to 60% by weight of other additives,
where the total of the percentages by weight of components A) to D) is 100%.

18 Claims, No Drawings

U.S. PATENT DOCUMENTS

| | | | |
|---|---|---|---|
| 2003/0082384 A1 | 5/2003 | Mhetar | |
| 2003/0171503 A1 | 9/2003 | Adedeji | |
| 2004/0138388 A1 | 7/2004 | Pecorini et al. | |
| 2004/0192857 A1 | 9/2004 | Borer et al. | |
| 2004/0220374 A1 | 11/2004 | Heuer et al. | |
| 2005/0025091 A1 | 2/2005 | Patel et al. | |
| 2005/0054812 A1 | 3/2005 | Wagner et al. | |
| 2005/0124779 A1 | 6/2005 | Shelby et al. | |
| 2005/0165177 A1 | 7/2005 | Wagner et al. | |
| 2006/0142442 A1 | 6/2006 | Scherzer et al. | |
| 2008/0015303 A1 | 1/2008 | Eibeck et al. | |

FOREIGN PATENT DOCUMENTS

| | | |
|---|---|---|
| CA | 2019904 | 1/1991 |
| CA | 733567 | 5/1996 |
| CA | 2256343 | 12/1997 |
| CA | 2554037 | 8/2005 |
| CA | 2554038 | 8/2005 |
| DE | 222868 | 6/1910 |
| DE | 3725576 | 2/1989 |
| DE | 3800603 | 7/1989 |
| DE | 4307392 | 4/1994 |
| DE | 4328004 | 2/1995 |
| DE | 19953950 | 5/2001 |
| DE | 10132928 | 1/2003 |
| DE | 101 36 911 | 2/2003 |
| DE | 10147712 | 4/2003 |
| DE | 10163163 | 7/2003 |
| DE | 55319 | 8/2003 |
| DE | 55320 | 8/2003 |
| DE | 10240817 | 3/2004 |
| DE | 10251294 | 5/2004 |
| DE | 10304341 | 8/2004 |
| DE | 102004005652 | 8/2005 |
| DE | 102004005657 | 8/2005 |
| DE | 102004057867 | 6/2006 |
| DE | 102005012482 | 9/2006 |
| EP | 0050265 | 4/1982 |
| EP | 0047529 | 6/1985 |
| EP | 0208187 | 1/1987 |
| EP | 0235690 | 9/1987 |
| EP | 0319290 | 6/1989 |
| EP | 0410301 | 1/1991 |
| EP | 0484737 | 5/1992 |
| EP | 0545184 | 6/1993 |
| EP | 0629644 | 12/1994 |
| EP | 0682057 | 11/1995 |
| EP | 0736571 | 10/1996 |
| EP | 1099727 | 5/2001 |
| EP | 1 207 172 A2 * | 5/2002 |
| EP | 1344794 | 9/2003 |
| EP | 1 424 360 | 6/2004 |
| EP | 1424362 | 6/2004 |
| FR | 2833603 | 6/2003 |
| FR | 2833604 | 6/2003 |
| FR | 2856693 | 12/2004 |
| GB | 1458561 | 12/1976 |
| GB | 1558308 | 12/1979 |
| GB | 2324797 | 11/1998 |
| JP | 4175366 | 6/1992 |
| JP | 2006/100758 | 9/1992 |
| JP | 06157880 | 11/1992 |
| JP | 08269306 | 3/1995 |
| JP | 09157503 | 12/1995 |
| JP | 11060663 | 3/1999 |
| JP | 11255853 | 9/1999 |
| JP | 11279245 | 10/1999 |
| SU | 519449 | 6/1976 |
| WO | WO-96/11962 | 4/1996 |
| WO | WO-97/05705 | 2/1997 |
| WO | WO-97/08241 | 3/1997 |
| WO | WO-97/45474 | 12/1997 |
| WO | WO-98/50453 | 11/1998 |
| WO | WO-02/32982 | 4/2002 |
| WO | WO-03/004546 | 1/2003 |
| WO | WO-03/064502 | 8/2003 |
| WO | WO-03/093343 | 11/2003 |
| WO | WO-2004/087785 | 10/2004 |
| WO | WO-2004/111126 | 12/2004 |
| WO | WO-2005/012380 | 2/2005 |
| WO | WO-2005/075563 | 8/2005 |
| WO | WO-2005/075565 | 8/2005 |
| WO | WO-2005/058385 | 10/2005 |
| WO | WO-2006/018128 | 2/2006 |
| WO | WO-2006/018179 | 2/2006 |
| WO | WO-2006/040066 | 4/2006 |
| WO | WO-2006/040101 | 4/2006 |
| WO | WO-2006/042673 | 4/2006 |
| WO | WO-2006/048247 | 5/2006 |
| WO | WO-2006/082201 | 8/2006 |
| WO | WO-2006/134115 | 12/2006 |
| WO | WO-2007/009930 | 1/2007 |
| WO | WO-2007/00929 | 12/2007 |
| WO | WO-2008/074687 | 6/2008 |

OTHER PUBLICATIONS

Sunder, et al., "Synthesis and Thermal Behaviour of Esterfied Alipghatic Hyperbranched Polyether Polyols", *Macromolecules* (2000), pp. 1330-1337, vol. 33.

Jang, Jyongsik, et al., "Crystallization Behaviour of Poly (ethylene terephthalate) Blended with Hyperbranched Polmers: The Effect of Terminal Groups and Composition of Hyperbranched Polymers". *Macromolecules*, 2000, 33, 1864-1870, XP-001079109.

P. Carr, et al., "Dielectric and mechanical characterization of aryl ester dendrimer/PET blends", Polymer, vol. 37, No. 12, 1996, pp. 2395-2401.

Lin, et al., "Polymerization of $A_2$ with $B_3$ Monomers: A Facile Approach to Hyperbranched Poly(aryl ester)s", *Macromolecules*, No. 36, 2003, pp. 9809-9816.

Luman, et al., "The Convergent Synthesis of Poly(glycerol-succinic acid) Dendritic macromolecules", Chem. Eur. J., No. 9, 2003, pp. 5618-5626.

Dr. S. Anders, et al., "Polycarbonate Polyacetale Polyester Celluloseester", Carl Hanser Verlag, 1192, pp. 118-119.

International Preliminary Report on Patentability for International Application No. PCT/EP2006/063167, issued Jan. 16, 2008.

International Preliminary Report on Patentability for International Application No. PCT/EP2006/063167, issued Dec. 17, 2007.

International Preliminary Report on Patentability for International Application No. PCT/EP2006/064182, issued Jan. 22, 2008.

International Preliminary Report on Patentability for International Application No. PCT/EP2006/064182, issued Feb. 5, 2008.

International Preliminary Report on Patentability for International Application No. PCT/EP2006/064180, issued Feb. 5, 2008.

International Preliminary Report on Patentability for International Application No. PCT/EP2006/064180, issued Jan. 22, 2008.

International Preliminary Report on Patentability for International Application No. PCT/EP2005/011704, issued May 22, 2007.

International Preliminary Report on Patentability for International Application No. PCT/EP2005/010854.

International Preliminary Report on Patentability for International Application No. PCT/EP2005/010854, issued Nov. 6, 2006.

International Preliminary Report on Patentability for International Application No. PCT/EP2006/042673.

International Preliminary Report on Patentability for International Application No. PCT/EP2006/042673, issued Jan. 12, 2007.

International Preliminary Report on Patentability for International Application No. PCT/EP2005/001015.

International Preliminary Report on Patentability for International Application No. PCT/EP2005/001015, issued May 8, 2006.

International Preliminary Report on Patentability for International Application No. PCT/EP2006/050590, issued Aug. 14, 2007.

International Preliminary Report on Patentability for International Application No. PCT/EP2006/050590, issued Aug. 7, 2007.

International Preliminary Report on Patentability for International Application No. PCT/EP2005/010762, issued Apr. 24, 2007.

* cited by examiner

IMPACT-MODIFIED POLYESTERS WITH HYPERBRANCHED POLYESTERS/POLYCARBONATES

This application is the National Phase of International Application No. PCT/EP2005/008339 filed on Aug. 2, 2005; and this application claims priority to Application No. 102004038979.9 filed in Germany on Aug. 10, 2004 under 35 U.S.C. §119; the entire contents of all are hereby incorporated by reference.

The invention relates to thermoplastic molding compositions, comprising
A) from 10 to 98% by weight of at least one thermoplastic polyester,
B) from 0.01 to 50% by weight of
B1) at least one highly branched or hyperbranched polycarbonate with an OH number of from 1 to 600 mg KOH/g of polycarbonate (to DIN 53240, Part 2), or
B2) at least one highly branched or hyperbranched polyester of $A_xB_y$ type, where x is at least 1.1 and y is at least 2.1, or a mixture of these,
C) from 1 to 40% by weight of an impact-modifying polymer,
D) from 0 to 60% by weight of other additives,
where the total of the percentages by weight of components A) to D) is 100%.

The invention further relates to the use of the inventive molding compositions for production of fibers, foils, or moldings of any kind, and to the moldings thus obtainable.

Polycarbonates are usually obtained from the reaction of alcohols with phosgene, or from the transesterification of alcohols or phenols with dialkyl or diaryl carbonates. Industrial importance is attached to aromatic polycarbonates, which are prepared from bisphenols, for example, while the part played by aliphatic polycarbonates has hitherto been subordinate in terms of market volume. In this connection, see also Becker/Braun, Kunststoff-Handbuch [Plastics Handbook], vol. 3/1, Polycarbonate, Polyacetale, Polyester, Celluloseester [Polycarbonates, polyacetals, polyesters, cellulose esters], Carl-Hanser-Verlag, Munich 1992, pp. 118-119.

The structure of the aliphatic polycarbonates described is generally linear or else has a small degree of branching. For example, U.S. Pat. No. 3,305,605 describes the use of solid linear polycarbonates with a molecular weight above 15 000 daltons as plasticizers for polyvinyl polymers.

To improve flowability, low-molecular-weight additives are usually added to thermoplastics. However, the action of these additives is subject to severe restriction, because, for example, the fall-off in mechanical properties becomes unacceptable when the amount added of the additive increases.

Highly functional polycarbonates of defined structure have been disclosed only recently.

S. P. Rannard and N. J. Davis, J. Am. Chem. Soc. 2000, 122, 11729, describe the preparation of dendrimeric polycarbonates with perfect branching, via reaction of carbonylbisimidazole as phosgene analog with bishydroxyethylamino-2-propanol. Syntheses giving perfect dendrimers are multistage syntheses and therefore expensive, and not very suitable for conversion to industrial scale.

D. H. Bolton and K. L. Wooley, Macromolecules 1997, 30, 1890, describe the preparation of high-molecular-weight, very rigid hyperbranched aromatic polycarbonates via reaction of 1,1,1-tris(4'-hydroxyphenyl)ethane with carbonylbisimidazole.

Hyperbranched polycarbonates can also be prepared according to WO 98/50453. In the process described in that specification, triols are again reacted with carbonylbisimidazole. Initially imidazolides are produced, and these then undergo a further intermolecular reaction to give the polycarbonates. In the method mentioned, the polycarbonates are produced in the form of colorless or pale yellow rubber-like products.

The syntheses mentioned giving highly branched or hyperbranched polycarbonates have the following disadvantages:
a) the hyperbranched products are either high-melting or else rubber-like, and this markedly restricts subsequent processibility.
b) imidazole liberated during the reaction has to be removed from the reaction mixture by a complicated process.
c) the reaction products always comprise terminal imidazolide groups. These groups are labile and have to be converted by way of a subsequent step into hydroxy groups, for example.
d) carbonyldiimidazole is a comparatively expensive chemical which greatly increases raw material costs.

Low-molecular-weight additives are usually added to semicrystalline thermoplastics in order to improve flowability. However, the action of these additives is very restricted because, for example, the fall-off in mechanical properties becomes intolerable when more than a certain amount of the additive is added.

WO-97/45474 discloses thermoplastic compositions which comprise dendrimeric polyesters in the form of an $AB_2$ molecule in a polyester. Here, a polyhydric alcohol as core molecule reacts with dimethylpropionic acid as $AB_2$ molecule to give a dendrimeric polyester. This comprises only OH functionalities at the end of the chain. Disadvantages of these mixtures are the high glass transition temperature of the dendrimeric polyesters, the comparatively complicated preparation process, and especially the poor solubility of the dendrimers in the polyester matrix.

According to the teaching of DE-A 101 32 928, the incorporation of branching agents of this type by means of compounding and solid-phase post-condensation improves mechanical properties (molecular weight increase). Disadvantages of the process variant described are the long preparation time and the disadvantageous properties previously mentioned.

DE 102004 005652.8 and DE 102004 005657.9 have previously proposed novel flow improvers for polyesters.

An object on which the present invention is based is to provide thermoplastic polyester molding compositions which have good flowability together with good mechanical properties.

Accordingly, the molding compositions defined at the outset have been found. Preferred embodiments are given in the subclaims.

The inventive molding compositions comprise, as component (A), from 10 to 98% by weight, preferably from 30 to 97.99% by weight, and in particular from 30 to 95% by weight, of at least one thermoplastic polyester other than B).

Use is generally made of polyesters A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain comprises an aromatic ring which derives from the aromatic dicarboxylic acid. There may also be substitution in the aromatic ring, e.g. by halogen, such as chlorine or bromine, or by $C_1$-$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 (measured in 0.5% strength by weight solution in a phenol/o-dichlorobenzene mixture (ratio by weight 1:1) at 25° C. in accordance with ISO 1628.

Particular preference is given to polyesters whose carboxyl end group content is up to 100 meq/kg of polyester, preferably up to 50 meq/kg of polyester and in particular up to 40 meq/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use recycled PET materials (also termed scrap PET), if appropriate mixed with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or foils.
2) post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are separated and purified and then melted and pelletized using an extruder. This usually facilitates handling and free flow, and metering for further steps in processing.

The recycled materials used may either be pelletized or in the form of regrind. The edge length should not be more than 10 mm, preferably less than 8 mm.

Because polyesters undergo hydrolytic cleavage during processing (due to traces of moisture) it is advisable to predry the recycled material. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

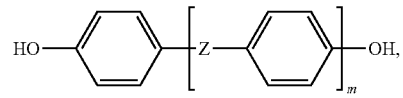

where Z is an alkylene or cycloalkylene group having up to 8 carbon atoms, an arylene group having up to 12 carbon atoms, a carbonyl group, a sulfonyl group, oxygen or sulfur, or a chemical bond, and m is from 0 to 2. The phenylene groups of the compounds may also have substitution by $C_1$-$C_6$-alkyl or alkoxy and fluorine, chlorine or bromine.

Examples of parent compounds for these compounds are
dihydroxybiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl) sulfone, di(hydroxybenzoyl)benzene,
resorcinol, and
hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, polyesters include halogen-free polycarbonates. Examples of suitable halogen-free polycarbonates are those based on diphenols of the formula

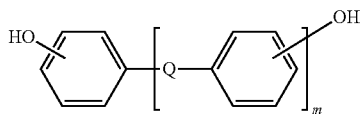

where Q is a single bond, a $C_1$-$C_8$-alkylene group, a $C_2$-$C_3$-alkylidene group, a $C_3$-$C_6$-cycloalkylidene group, a $C_6$-$C_{12}$-arylene group, or —O—, —S— or —SO$_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically by incorporating 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight-average) of from 10 000 to 200 000 g/mol, preferably from 20 000 to 80 000 g/mol.

The diphenols of the general formula are known per se or can be prepared by known processes.

The polycarbonates may, for example, be prepared by reacting the diphenols with phosgene in the interfacial process, or with phosgene in the homogeneous-phase process (known as the pyridine process), and in each case the desired molecular weight may be achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A-35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates composed of halogen-free biphenols, halogen-free chain terminators and, if used, halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the preparation process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

As component B), the inventive molding compositions comprise from 0.01 to 50% by weight, preferably from 0.5 to 20% by weight, and in particular from 0.7 to 10% by weight, of B1) at least one highly branched or hyperbranched polycarbonate having an OH number of from 1 to 600 mg KOH/g of polycarbonate, preferably from 10 to 550 mg KOH/g of polycarbonate, and in particular from 50 to 550 mg KOH/g of polycarbonate (to DIN 53240, Part 2), or of at least one hyperbranched polyester as component B2), or a mixture of these, as explained below.

For the purposes of this invention, hyperbranched polycarbonates B1) are non-crosslinked macromolecules having hydroxy groups and carbonate groups, these having both structural and molecular non-uniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%.

"Dendrimer" in the context of the present invention means that the degree of branching is from 99.9 to 100%. See H. Frey et al., Acta Polym. 1997, 48, 30 for the definition of "degree of branching"; it is defined as $$DB = \frac{T+Z}{T+Z+L} \times 100\%$$

(where T is the average number of terminal monomer units, Z is the average number of branched monomer units, and L is the average number of linear monomer units in the macromolecules of the respective substances).

Component B1) preferably has a number-average molar mass $M_n$ of from 100 to 15 000 g/mol, preferably from 200 to 12 000 g/mol, and in particular from 500 to 10 000 g/mol (GPC, PMMA standard).

The glass transition temperature Tg is in particular from −80 to +140° C., preferably from −60 to 120° C. (according to DSC, DIN 53765).

In particular, the viscosity (mPas) at 23° C. (to DIN 53019) is from 50 to 200 000, in particular from 100 to 150 000, and very particularly preferably from 200 to 100 000.

Component B1) is preferably obtainable via a process which comprises at least the following steps:

a) reaction of at least one organic carbonate (A) of the general formula RO[(CO)]$_n$OR with at least one aliphatic, aliphatic/aromatic or aromatic alcohol (B) which has at least 3 OH groups, with elimination of alcohols ROH to give one or more condensates (K), where each R, independently of the others, is a straight-chain or branched aliphatic, aromatic/aliphatic, or aromatic hydrocarbon radical having from 1 to 20 carbon atoms, and where the radicals R may also have bonding to one another to form a ring, and n is a whole number from 1 to 5, or ab) reaction of phosgene, diphosgene, or triphosgene with abovementioned alcohol (B) with elimination of hydrogen chloride, and also b) intermolecular reaction of the condensates (K) to give a highly functional, highly branched, or highly functional, hyperbranched polycarbonate, where the quantitative proportion of the OH groups to the carbonates in the reaction mixture is selected in such a way that the condensates (K) have an average of either one carbonate group and more than one OH group or one OH group and more than one carbonate group.

The starting material used may comprise phosgene, diphosgene, or triphosgene, but organic carbonates are preferred.

Each of the radicals R of the organic carbonates (A) used as starting material and having the general formula RO(CO)$_n$OR is, independently of the others, a straight-chain or branched aliphatic, aromatic/aliphatic or aromatic hydrocarbon radical having from 1 to 20 carbon atoms. The two radicals R may also have bonding to one another to form a ring. The radical is preferably an aliphatic hydrocarbon radical, and particularly preferably a straight-chain or branched alkyl radical having from 1 to 5 carbon atoms, or a substituted or unsubstituted phenyl radical.

In particular, simple carbonates of the formula RO(CO)$_n$OR are used; n is preferably from 1 to 3, in particular 1.

By way of example, dialkyl or diaryl carbonates may be prepared from the reaction of aliphatic, araliphatic, or aromatic alcohols, preferably monoalcohols, with phosgene. They may also be prepared by way of oxidative carbonylation of the alcohols or phenols by means of CO in the presence of noble metals, oxygen, or NO$_x$. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic, aromatic/aliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates in which n is greater than 1 comprise dialkyl dicarbonates, such as di(tert-butyl)dicarbonate, or dialkyl tricarbonates, such as di(tert-butyl) tricarbonate.

It is preferable to use aliphatic carbonates, in particular those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol (B) which has at least 3 OH groups, or with mixtures of two or more different alcohols.

Examples of compounds having at least three OH groups comprise glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol, polyglycerols, bis(trimethylolpropane), tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxy-phenyl)ethane, bis(trimethylolpropane), or sugars, e.g. glucose, trihydric or higher polyhydric polyetherols based on trihydric or higher polyhydric alcohols and ethylene oxide, propylene oxide, or butylene oxide, or polyesterols. Particular preference is given here to glycerol, trimethylolethane, trimethylolpropane, 1,2,4-butanetriol, pentaerythritol, and also their polyetherols based on ethylene oxide or propylene oxide.

These polyhydric alcohols may also be used in a mixture with dihydric alcohols (B'), with the proviso that the average total OH functionality of all of the alcohols used is greater than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxyphenyl, bis-(4-bis(hydroxyphenyl)sulfide, bis(4-hydroxyphenyl)sulfone, bis(hydroxymethyl)benzene, bis(hydroxymethyl)toluene, bis(p-hydroxyphenyl)methane, bis(p-hydroxyphenyl)ethane, 2,2-bis(p-hydroxyphenyl)propane, 1,1-bis(p-hydroxyphenyl)cyclohexane, dihydroxybenzophenone, dihydric polyether polyols based on ethylene oxide, propylene oxide, butylene oxide, or their mixtures, polytetrahydrofuran, polycaprolactone, or polyesterols based on diols and dicarboxylic acids.

The diols serve for fine adjustment of the properties of the polycarbonate. If use is made of dihydric alcohols, the ratio of dihydric alcohols B') to the at least trihydric alcohols (B) is set by the person skilled in the art, depending on the desired properties of the polycarbonate. The amount of the alcohol(s) (B') is generally from 0 to 50 mol %, based on the entire amount of all of the alcohols (B) and (B') together. The amount is preferably from 0 to 45 mol %, particularly preferably from 0 to 35 mol %, and very particularly preferably from 0 to 30 mol %.

The reaction of phosgene, diphosgene, or triphosgene with the alcohol or alcohol mixture generally takes place with elimination of hydrogen chloride, and the reaction of the carbonates with the alcohol or alcohol mixture to give the inventive highly functional highly branched polycarbonate takes place with elimination of the monohydric alcohol or phenol from the carbonate molecule.

The highly functional highly branched polycarbonates formed by the inventive process have termination by hydroxy groups and/or by carbonate groups after the reaction, i.e. with no further modification. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

For the purposes of this invention, a highly functional polycarbonate is a product which, besides the carbonate groups which form the polymer skeleton, further has at least three, preferably at least six, more preferably at least ten, terminal or pendant functional groups. The functional groups are carbonate groups and/or OH groups. There is in principle no upper restriction on the number of the terminal or pendant functional groups, but products having a very high number of functional groups can have undesired properties, such as high viscosity or poor solubility. The highly functional polycarbonates of the present invention mostly have not more than 500 terminal or pendant functional groups, preferably not more than 100 terminal or pendant functional groups.

When preparing the highly functional polycarbonates B1), it is necessary to adjust the ratio of the compounds comprising OH groups to phosgene or carbonate in such a way that the simplest resultant condensate (hereinafter termed condensate (K)) comprises an average of either one carbonate group or carbamoyl group and more than one OH group or one OH group and more than one carbonate group or carbamoyl group. The simplest structure of the condensate (K) composed of a carbonate (A) and a di- or polyalcohol (B) here results in the arrangement $XY_n$ or $Y_nX$, where X is a carbonate group, Y is a hydroxy group, and n is generally a number from 1 to 6, preferably from 1 to 4, particularly preferably from 1 to 3. The reactive group which is the single resultant group here is generally termed "focal group" below.

By way of example, if during the preparation of the simplest condensate (K) from a carbonate and a dihydric alcohol the reaction ratio is 1:1, the average result is a molecule of XY type, illustrated by the general formula 1.

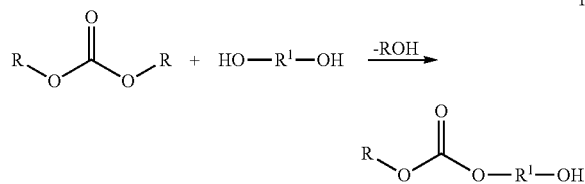

1

During the preparation of the condensate (K) from a carbonate and a trihydric alcohol with a reaction ratio of 1:1, the average result is a molecule of $XY_2$ type, illustrated by the general formula 2. A carbonate group is focal group here.

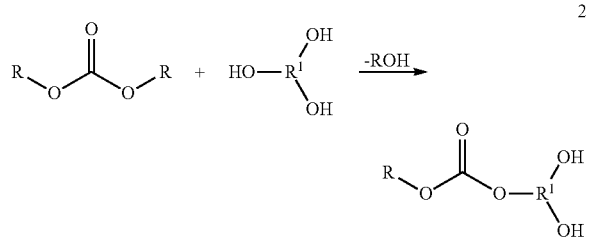

2

During the preparation of the condensate (K) from a carbonate and a tetrahydric alcohol, likewise with the reaction ratio 1:1, the average result is a molecule of $XY_3$ type, illustrated by the general formula 3. A carbonate group is focal group here.

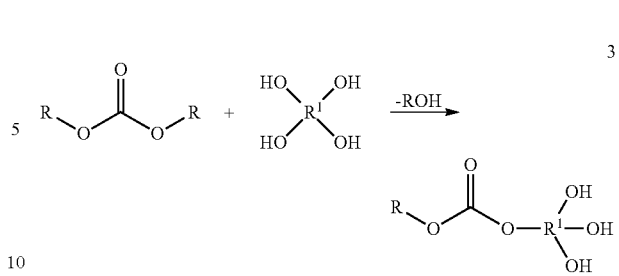

3

R in the formulae 1-3 has the definition given at the outset, and $R^1$ is an aliphatic or aromatic radical.

The condensate (K) may, by way of example, also be prepared from a carbonate and a trihydric alcohol, as illustrated by the general formula 4, the molar reaction ratio being 2:1. Here, the average result is a molecule of $X_2Y$ type, an OH group being focal group here. In formula 4, R and R' are as defined in formulae 1-3.

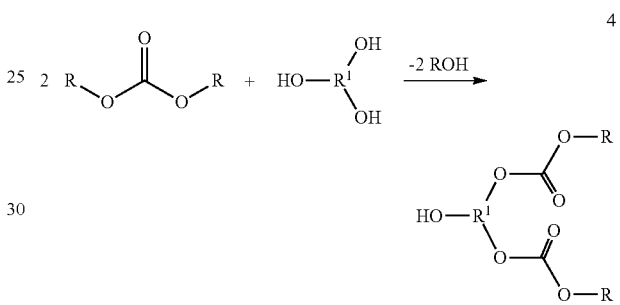

4

If difunctional compounds, e.g. a dicarbonate or a diol, are also added to the components, this extends the chains, as illustrated by way of example in the general formula 5. The average result is again a molecule of $XY_2$ type, a carbonate group being focal group.

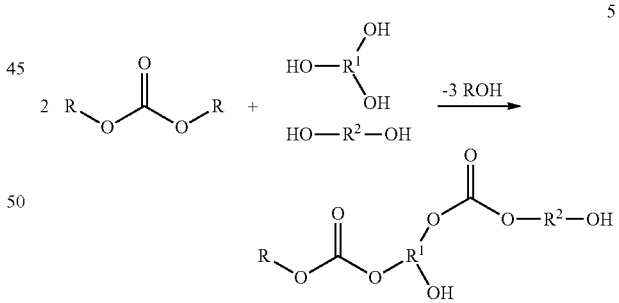

5

In formula 5, $R^2$ is an organic, preferably aliphatic radical, and R and $R^1$ are as defined above.

It is also possible to use two or more condensates (K) for the synthesis. Here, firstly two or more alcohols or two or more carbonates may be used. It is also possible to obtain mixtures of various condensates of different structure via the selection of the ratio of the alcohols used and of the carbonates or of the phosgenes. This will be illustrated by way of example, taking the example of the reaction of a carbonate with a trihydric alcohol. If the ratio used of the starting materials is 1:1, as shown in (II), the product is an $XY_2$ molecule. If the ratio used of the starting materials is 2:1, as shown in (IV), this gives an $X_2Y$ molecule. If the ratio is from 1:1 to 2:1, this gives a mixture of $XY_2$ and $X_2Y$ molecules.

According to the invention, the simple condensates (K) described by way of example in the formulae 1-5 preferentially react intermolecularly to form highly functional polycondensates, hereinafter termed polycondensates (P). The reaction to give the condensate (K) and to give the polycondensate (P) usually takes place at a temperature of from 0 to 250° C., preferably from 60 to 160° C., in bulk or in solution. Use may generally be made here of any of the solvents which are inert with respect to the respective starting materials. Preference is given to use of organic solvents, e.g. decane, dodecane, benzene, toluene, chlorobenzene, xylene, dimethylformamide, dimethylacetamide, or solvent naphtha.

In one preferred embodiment, the condensation reaction is carried out in bulk. The phenol or the monohydric alcohol ROH liberated during the reaction can be removed by distillation from the reaction equilibrium to accelerate the reaction, if appropriate at reduced pressure.

If removal by distillation is intended, it is generally advisable to use those carbonates which liberate alcohols ROH with a boiling point below 140° C. during the reaction.

Catalysts or catalyst mixtures may also be added to accelerate the reaction. Suitable catalysts are compounds which catalyze esterification or transesterification reactions, e.g. alkali metal hydroxides, alkali metal carbonates, alkali metal hydrogencarbonates, preferably of sodium, or potassium, or of cesium, tertiary amines, guanidines, ammonium compounds, phosphonium compounds, organoaluminum, organotin, organozinc, organotitanium, organozirconium, or organobismuth compounds, or else what are known as double metal cyamide (DMC) catalysts, e.g. as described in DE 10138216 or DE 10147712.

It is preferable to use potassium hydroxide, potassium carbonate, potassium hydrogencarbonate, diazabicyclooctane (DABCO), diazabicyclononene (DBN), diazabicycloundecene (DBU), imidazoles, such as imidazole, 1-methylimidazole, or 1,2-dimethylimidazole, titanium tetrabutoxide, titanium tetraisopropoxide, dibutyltin oxide, dibutyltin dilaurate, stannous dioctoate, zirconium acetylacetonate, or mixtures thereof.

The amount of catalyst generally added is from 50 to 10 000 ppm by weight, preferably from 100 to 5000 ppm by weight, based on the amount of the alcohol mixture or alcohol used.

It is also possible to control the intermolecular polycondensation reaction via addition of the suitable catalyst or else via selection of a suitable temperature. The average molecular weight of the polymer (P) may moreover be adjusted by way of the composition of the starting components and by way of the residence time.

The condensates (K) and the polycondensates (P) prepared at an elevated temperature are usually stable at room temperature for a relatively long period.

The nature of the condensates (K) permits polycondensates (P) with different structures to result from the condensation reaction, these having branching but no crosslinking. Furthermore, in the ideal case, the polycondensates (P) have either one carbonate group as focal group and more than two OH groups or else one OH group as focal group and more than two carbonate groups. The number of the reactive groups here is the result of the nature of the condensates (K) used and the degree of polycondensation.

By way of example, a condensate (K) according to the general formula 2 can react via triple intermolecular condensation to give two different polycondensates (P), represented in the general formulae 6 and 7.

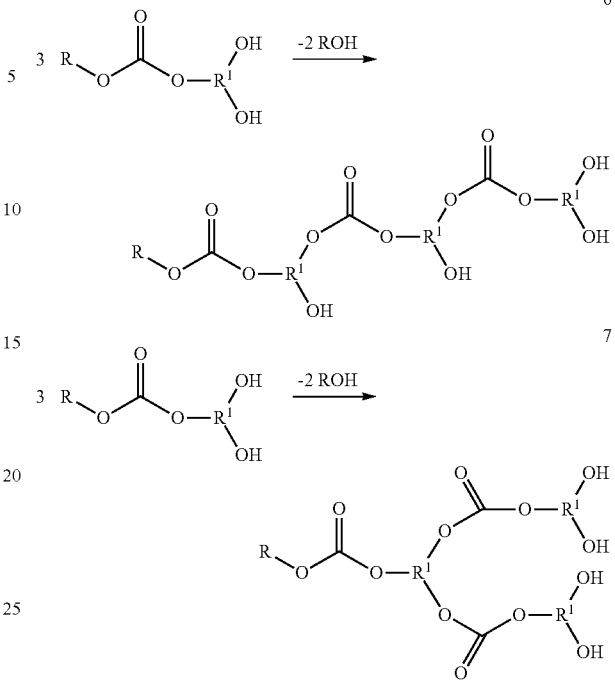

In formula 6 and 7, R and $R^1$ are as defined above.

There are various ways of terminating the intermolecular polycondensation reaction. By way of example, the temperature may be lowered to a range where the reaction stops and the product (K) or the polycondensate (P) is storage-stable.

It is also possible to deactivate the catalyst, for example in the case of basic catalysts via addition of Lewis acids or proton acids.

In another embodiment, as soon as the intermolecular reaction of the condensate (K) has produced a polycondensate (P) with the desired degree of polycondensation, a product having groups reactive toward the focal group of (P) may be added to the product (P) to terminate the reaction. For example, in the case of a carbonate group as focal group, by way of example, a mono-, di-, or polyamine may be added. In the case of a hydroxy group as focal group, by way of example, a mono-, di-, or polyisocyanate, or a compound comprising epoxy groups, or an acid derivative which reacts with OH groups, can be added to the product (P).

The inventive highly functional polycarbonates are mostly prepared in the pressure range from 0.1 mbar to 20 bar, preferably at from 1 mbar to 5 bar, in reactors or reaction cascades which are operated batchwise, semicontinuously, or continuously.

The inventive products can be further processed without further purification after their preparation by virtue of the abovementioned adjustment of the reaction conditions and, if appropriate, by virtue of the selection of the suitable solvent.

In another preferred embodiment, the product is stripped, i.e. freed from low-molecular-weight, volatile compounds. For this, once the desired degree of conversion has been achieved the catalyst may optionally be deactivated, and the low-molecular-weight volatile constituents, e.g. monoalcohols, phenols, carbonates, hydrogen chloride, or volatile oligomeric or cyclic compounds, can be removed by distillation, if appropriate with introduction of a gas, preferably nitrogen, carbon dioxide, or air, if appropriate at reduced pressure.

In another preferred embodiment, the inventive polycarbonates may contain other functional groups besides the functional groups present at this stage by virtue of the reaction. The functionalization may take place during the process to increase molecular weight, or else subsequently, i.e. after completion of the actual polycondensation.

If, prior to or during the process to increase molecular weight, components are added which have other functional groups or functional elements besides hydroxy or carbonate groups, the result is a polycarbonate polymer with randomly distributed functionalities other than the carbonate or hydroxy groups.

Effects of this type can, by way of example, be achieved via addition, during the polycondensation, of compounds which bear other functional groups or functional elements, such as mercapto groups, primary, secondary or tertiary amino groups, ether groups, derivatives of carboxylic acids, derivatives of sulfonic acids, derivatives of phosphonic acids, silane groups, siloxane groups, aryl radicals, or long-chain alkyl radicals, besides hydroxy groups, carbonate groups or carbamoyl groups. Examples of compounds which may be used for modification by means of carbamate groups are ethanolamine, propanolamine, isopropanolamine; 2-(butylamino) ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxyethyl)aminomethane, ethylenediamine, propylenediamine, hexamethylenediamine or isophoronediamine.

An example of a compound which can be used for modification with mercapto groups is mercaptoethanol. By way of example, tertiary amino groups can be produced via incorporation of N-methyldiethanolamine, N-methyldipropanolamine or N,N-dimethylethanolamine. By way of example, ether groups may be generated via co-condensation of dihydric or higher polyhydric polyetherols. Long-chain alkyl radicals can be introduced via reaction with long-chain alkanediols, and reaction with alkyl or aryl diisocyanates generates polycarbonates having alkyl, aryl, and urethane groups or urea groups.

Ester groups can be produced via addition of dicarboxylic acids, tricarboxylic acids or, for example, dimethyl terephthalate, or tricarboxylic esters.

Subsequent functionalization can be achieved by using an additional step of the process (step c)) to react the resultant highly functional highly branched, or highly functional hyperbranched polycarbonate with a suitable functionalizing reagent which can react with the OH and/or carbonate groups or carbamoyl groups of the polycarbonate.

By way of example, highly functional highly branched, or highly functional hyperbranched polycarbonates comprising hydroxy groups can be modified via addition of molecules comprising acid groups or comprising isocyanate groups. By way of example, polycarbonates comprising acid groups can be obtained via reaction with compounds comprising anhydride groups.

Highly functional polycarbonates comprising hydroxy groups may moreover also be converted into highly functional polycarbonate polyether polyols via reaction with alkylene oxides, e.g. ethylene oxide, propylene oxide, or butylene oxide.

A great advantage of the process is its cost-effectiveness. Both the reaction to give a condensate (K) or polycondensate (P) and also the reaction of (K) or (P) to give polycarbonates with other functional groups or elements can take place in one reactor, this being advantageous technically and in terms of cost-effectiveness.

The inventive molding compositions comprise, as component B2), at least one hyperbranched polyester of $A_xB_y$ type, where x is at least 1.1, preferably at least 1.3, in particular at least 2
y is at least 2.1, preferably at least 2.5, in particular at least 3.

Use may also be made of mixtures as units A and/or B, of course.

An $A_xB_y$-type polyester is a condensate composed of an x-functional molecule A and a y-functional molecule B. By way of example, mention may be made of a polyester composed of adipic acid as molecule A (x=2) and glycerol as molecule B (y=3).

For the purposes of this invention, hyperbranched polyesters B2) are non-crosslinked macromolecules having hydroxy groups and carbonate groups, these having both structural and molecular non-uniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%.

"Dendrimer" in the context of the present invention means that the degree of branching is from 99.9 to 100%. See H. Frey et al., Acta Polym. 1997, 48, 30 for the definition of "degree of branching".

Component B2) preferably has an $M_n$ of from 300 to 30 000 g/mol, in particular from 400 to 25 000 g/mol, and very particularly from 500 to 20 000 g/mol, determined by means of GPC, PMMA standard, dimethylacetamide eluent.

B2) preferably has an OH number of from 0 to 600 mg KOH/g of polyester, preferably of from 1 to 500 mg KOH/g of polyester, in particular from 20 to 500 mg KOH/g of polyester to DIN 53240, and preferably a COOH number of from 0 to 600 mg KOH/g of polyester, preferably from 1 to 500 mg KOH/g of polyester, and in particular from 2 to 500 mg KOH/g of polyester.

The $T_g$ is preferably from −50° C. to 140° C., and in particular from −50 to 100° C. (by means of DSC, to DIN 53765).

Preference is particularly given to those components B2) in which at least one OH or COOH number is greater than 0, preferably greater than 0.1, and in particular greater than 0.5.

The inventive component B2) is in particular obtainable via the processes described below, inter alia by reacting
(a) one or more dicarboxylic acids or one or more derivatives of the same with one or more at least trihydric alcohols or
(b) one or more tricarboxylic acids or higher polycarboxylic acids or one or more derivatives of the same with one or more diols in the presence of a solvent and optionally in the presence of an inorganic, organometallic, or low-molecular-weight organic catalyst, or of an enzyme. The reaction in solvent is the preferred preparation method.

For the purposes of the present invention, highly functional hyperbranched polyesters B2) have molecular and structural non-uniformity. Their molecular non-uniformity distinguishes them from dendrimers, and they can therefore be prepared at considerably lower cost.

Among the dicarboxylic acids which can be reacted according to variant (a) are, by way of example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid, and the abovementioned dicarboxylic acids may have substitution by one or more radicals selected from $C_1$-$C_{10}$-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl groups, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl;

alkylene groups, such as methylene or ethylidene, or $C_6$-$C_{14}$-aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, particularly preferably phenyl.

Examples which may be mentioned of representatives of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Among the dicarboxylic acids which can be reacted according to variant (a) are also ethylenically unsaturated acids, such as maleic acid and fumaric acid, and aromatic dicarboxylic acids, such as phthalic acid, isophthalic acid or terephthalic acid.

It is also possible to use mixtures of two or more of the abovementioned representative compounds.

The dicarboxylic acids may either be used as they stand or be used in the form of derivatives.

Derivatives are preferably the relevant anhydrides in monomeric or else polymeric form, mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol, and also mono- and divinyl esters, and mixed esters, preferably methyl ethyl esters.

In the preferred preparation process it is also possible to use a mixture composed of a dicarboxylic acid and one or more of its derivatives. Equally, it is possible to use a mixture of two or more different derivatives of one or more dicarboxylic acids.

It is particularly preferable to use succinic acid, glutaric acid, adipic acid, phthalic acid, isophthalic acid, terephthalic acid, or the mono- or dimethyl ester thereof. It is very particularly preferable to use adipic acid.

Examples of at least trihydric alcohols which may be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols, such as mesoerythritol, threitol, sorbitol, mannitol, or mixtures of the above at least trihydric alcohols. It is preferable to use glycerol, trimethylolpropane, trimethylolethane, and pentaerythritol.

Examples of tricarboxylic acids or polycarboxylic acids which can be reacted according to variant (b) are benzene-1,2,4-tricarboxylic acid, benzene-1,3,5-tricarboxylic acid, benzene-1,2,4,5-tetracarboxylic acid, and mellitic acid.

Tricarboxylic acids or polycarboxylic acids may be used in the inventive reaction either as they stand or else in the form of derivatives.

Derivatives are preferably the relevant anhydrides in monomeric or else polymeric form, mono-, di-, or trialkyl esters, preferably mono-, di-, or trimethyl esters, or the corresponding mono-, di-, or triethyl esters, or else the mono-, di-, and triesters derived from higher alcohols, such as n-propanol, isopropanol, n-butanol, isobutanol, tert-butanol, n-pentanol, n-hexanol, or else mono-, di-, or trivinyl esters and mixed methyl ethyl esters.

For the purposes of the present invention, it is also possible to use a mixture composed of a tri- or polycarboxylic acid and one or more of its derivatives. For the purposes of the present invention it is likewise possible to use a mixture of two or more different derivatives of one or more tri- or polycarboxylic acids, in order to obtain component B2).

Examples of diols used for variant (b) of the present invention are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptan-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, (2)-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more representative compounds of the above compounds, where n is a whole number and n=from 4 to 25. One, or else both, hydroxy groups here in the abovementioned diols may also be substituted by SH groups. Preference is given to ethylene glycol, propane-1,2-diol, and diethylene glycol, triethylene glycol, dipropylene glycol, and tripropylene glycol.

The molar ratio of the molecules A to molecules B in the $A_xB_y$ polyester in the variants (a) and (b) is from 4:1 to 1:4, in particular from 2:1 to 1:2.

The at least trihydric alcohols reacted according to variant (a) of the process may have hydroxy groups of which all have identical reactivity. Preference is also given here to at least trihydric alcohols whose OH groups initially have identical reactivity, but where reaction with at least one acid group can induce a fall-off in reactivity of the remaining OH groups as a result of steric or electronic effects. By way of example, this applies when trimethylolpropane or pentaerythritol is used.

However, the at least trihydric alcohols reacted according to variant (a) may also have hydroxy groups having at least two different chemical reactivities.

The different reactivity of the functional groups here may either derive from chemical causes (e.g. primary/secondary/tertiary OH group) or from steric causes.

By way of example, the triol may comprise a triol which has primary and secondary hydroxy groups, preferred example being glycerol.

When the inventive reaction is carried out according to variant (a), it is preferable to operate in the absence of diols and monohydric alcohols.

When the inventive reaction is carried out according to variant (b), it is preferable to operate in the absence of mono- or dicarboxylic acids.

The inventive process is preferably carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents in the absence of acidic catalysts are: ethers, such as dioxane or tetrahydrofuran, and ketones, such as methyl ethyl ketone and methyl isobutyl ketone.

According to the invention, the amount of solvent added is at least 0.1% by weight, based on the weight of the starting materials used and to be reacted, preferably at least 1% by weight, and particularly preferably at least 10% by weight. It is also possible to use excesses of solvent, based on the weight of starting materials used and to be reacted, e.g. from 1.01 to 10 times the amount. Solvent amounts of more than 100 times the weight of the starting materials used and to be reacted are not advantageous, because the reaction rate reduces markedly at markedly lower concentrations of the reactants, giving uneconomically long reaction times.

To carry out the process preferred according to the invention, operations may be carried out in the presence of a dehydrating agent as additive, added at the start of the reaction. Suitable examples are molecular sieves, in particular 4 Å molecular sieve, $MgSO_4$, and $Na_2SO_4$. During the reaction it is also possible to add further dehydrating agent or to replace dehydrating agent by fresh dehydrating agent. During the reaction it is also possible to remove the water or alcohol formed by distillation and, for example, to use a water separator.

The process may be carried out in the absence of acidic catalysts. It is preferable to operate in the presence of an acidic inorganic, organometallic, or organic catalyst, or a mixture composed of two or more acidic inorganic, organometallic, or organic catalysts.

For the purposes of the present invention, examples of acidic inorganic catalysts are sulfuric acid, phosphoric acid, phosphonic acid, hypophosphorous acid, aluminum sulfate hydrate, alum, acidic silica gel (pH=6, in particular =5), and acidic aluminum oxide. Examples of other compounds which can be used as acidic inorganic catalysts are aluminum compounds of the general formula $Al(OR)_3$ and titanates of the general formula $Ti(OR)_4$, where each of the radicals R may be identical or different and is selected independently of the others from $C_1$-$C_{10}$-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl.

Each of the radicals R in $Al(OR)_3$ or $Ti(OR)_4$ is preferably identical and selected from isopropyl or 2-ethylhexyl.

Examples of preferred acidic organometallic catalysts are selected from dialkyltin oxides $R_2SnO$, where R is defined as above. A particularly preferred representative compound for acidic organometallic catalysts is di-n-butyltin oxide, which is commercially available as "oxo-tin", or di-n-butyltin dilaurate.

Preferred acidic organic catalysts are acidic organic compounds having, by way of example, phosphate groups, sulfonic acid groups, sulfate groups, or phosphonic acid groups. Particular preference is given to sulfonic acids, such as para-toluenesulfonic acid. Acidic ion exchangers may also be used as acidic organic catalysts, e.g. polystyrene resins containing sulfonic acid groups and crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic, or organic catalysts, according to the invention the amount used is from 0.1 to 10% by weight, preferably from 0.2 to 2% by weight, of catalyst.

The inventive process is carried out under inert gas, e.g. under carbon dioxide, nitrogen, or a noble gas, among which mention may particularly be made of argon.

The inventive process is carried out at temperatures of from 60 to 200° C. It is preferable to operate at temperatures of from 130 to 180° C., in particular up to 150° C., or below that temperature. Maximum temperatures up to 145° C. are particularly preferred, and temperatures up to 135° C. are very particularly preferred.

The pressure conditions for the inventive process are not critical per se. It is possible to operate at markedly reduced pressure, e.g. at from 10 to 500 mbar. The inventive process may also be carried out at pressures above 500 mbar. A reaction at atmospheric pressure is preferred for reasons of simplicity; however, conduct at slightly increased pressure is also possible, e.g. up to 1200 mbar. It is also possible to operate at markedly increased pressure, e.g. at pressures up to 10 bar. Reaction at atmospheric pressure is preferred.

The reaction time for the inventive process is usually from 10 minutes to 25 hours, preferably from 30 minutes to 10 hours, and particularly preferably from one to 8 hours.

Once the reaction has ended, the highly functional hyperbranched polyesters can easily be isolated, e.g. by removing the catalyst by filtration and concentrating the mixture, the concentration process here usually being carried out at reduced pressure. Other work-up methods with good suitability are precipitation after addition of water, followed by washing and drying.

Component B2) can also be prepared in the presence of enzymes or decomposition products of enzymes (according to DE-A 101 63163). For the purposes of the present invention, the term acidic organic catalysts does not include the dicarboxylic acids reacted according to the invention.

It is preferable to use lipases or esterases. Lipases and esterases with good suitability are *Candida cylindracea, Candida lipolytica, Candida rugosa, Candida antarctica, Candida utilis, Chromobacterium viscosum, Geolrichum viscosum, Geotrichum candidum, Mucor javanicus, Mucor mihei*, pig pancreas, *pseudomonas* spp., *pseudomonas fluorescens, Pseudomonas cepacia, Rhizopus arrhizus, Rhizopus delemar,*

*Rhizopus niveus, Rhizopus oryzae, Aspergillus niger, Penicillium roquefortii, Penicillium camembertii*, or esterase from *Bacillus* spp. and *Bacillus thermoglucosidasius*. *Candida antarctica* lipase B is particularly preferred. The enzymes listed are commercially available, for example from Novozymes Biotech Inc., Denmark.

The enzyme is preferably used in immobilized form, for example on silica gel or Lewatit®. The processes for immobilizing enzymes are known per se, e.g. from Kurt Faber, "Biotransformations in organic chemistry", 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme used is from 0.1 to 20% by weight, in particular from 10 to 15% by weight, based on the total weight of the starting materials used and to be reacted.

The inventive process is carried out at temperatures above 60° C. It is preferable to operate at temperatures of 100° C. or below that temperature. Preference is given to temperatures up to 80° C., very particular preference is given to temperatures of from 62 to 75° C., and still more preference is given to temperatures of from 65 to 75° C.

The inventive process is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents are: ethers, such as dioxane or tetrahydrofuran, and ketones, such as methyl ethyl ketone and methyl isobutyl ketone.

The amount of solvent added is at least 5 parts by weight, based on the weight of the starting materials used and to be reacted, preferably at least 50 parts by weight, and particularly preferably at least 100 parts by weight. Amounts of more than 10 000 parts by weight of solvent are undesirable, because the reaction rate decreases markedly at markedly lower concentrations, giving uneconomically long reaction times.

The inventive process is carried out at pressures above 500 mbar. Preference is given to the reaction at atmospheric pressure or slightly increased pressure, for example at up to 1200 mbar. It is also possible to operate under markedly increased pressure, for example at pressures up to 10 bar. The reaction at atmospheric pressure is preferred.

The reaction time for the inventive process is usually from 4 hours to 6 days, preferably from 5 hours to 5 days, and particularly preferably from 8 hours to 4 days.

Once the reaction has ended, the highly functional hyperbranched polyesters can be isolated, e.g. by removing the enzyme by filtration and concentrating the mixture, the concentration process here usually being carried out at reduced pressure. Other work-up methods with good suitability are precipitation after addition of water, followed by washing and drying.

The highly functional, hyperbranched polyesters obtainable by the inventive process feature particularly low content of discolored and resinified material. For the definition of hyperbranched polymers, see also: P. J. Flory, J. Am. Chem. Soc. 1952, 74, 2718, and A. Sunder et al., Chem. Eur. J. 2000, 6, no. 1, 1-8. However, in the context of the present invention, "highly functional hyperbranched" means that the degree of branching, i.e. the average number of dendritic linkages plus the average number of end groups per molecule is from 10 to 99.9%, preferably from 20 to 99%, particularly preferably from 30 to 90% (see in this connection H. Frey et al. Acta Polym. 1997, 48, 30).

The inventive polyesters have a molar mass $M_w$ of from 500 to 50 000 g/mol, preferably from 1000 to 20 000 g/mol, particularly preferably from 1000 to 19 000 g/mol. The polydispersity is from 1.2 to 50, preferably from 1.4 to 40, particularly preferably from 1.5 to 30, and very particularly preferably from 1.5 to 10. They are usually very soluble, i.e. clear solutions can be prepared using up to 50% by weight, in some cases even up to 80% by weight, of the inventive polyesters in tetrahydrofuran (THF), n-butyl acetate, ethanol, and numerous other solvents, with no gel particles detectable by the naked eye.

The inventive highly functional hyperbranched polyesters are carboxy-terminated, carboxy- and hydroxy-terminated, and preferably hydroxy-terminated.

If a mixture of the components B1) and B2) is used, the ratios of the components B1): B2) are preferably from 1:20 to 20:1, in particular from 1:15 to 15:1, and very particularly from 1:5 to 5:1.

The hyperbranched polycarbonates B1)/polyesters B2) used take the form of particles of size from 20 to 500 nm. These nanoparticles are present in fine dispersion in the polymer blend, and the size of the particles in the compounded material is from 20 to 500 nm, preferably from 50 to 300 nm.

Compounded materials of this type are commercially available as Ultradur® high speed.

As component (C), the inventive thermoplastic molding compositions comprise from 1 to 40% by weight, preferably from 1 to 20% by weight, of an impact-modifying polymer (often also termed elastomeric polymer or elastomer).

Preferred elastomeric polymers are polymers based on olefins, composed of the following components:

$C_1$) from 40 to 100% by weight, preferably from 55 to 79.5% by weight, of at least one α-olefin having from 2 to 8 carbon atoms, $C_2$) from 0 to 90% by weight of a diene, $C_3$) from 0 to 45% by weight, preferably from 20 to 40% by weight, of a $C_1$-$C_{12}$-alkyl ester of acrylic acid or methacrylic acid, or a mixture of these esters, $C_4$) from 0 to 40% by weight, preferably from 0.5 to 20% by weight, of an ethylenically unsaturated mono- or dicarboxylic acid, or of a functional derivative of this acid, $C_5$) from 0 to 40% by weight of a monomer comprising epoxy groups, $C_6$) from 0 to 5% by weight of other monomers capable of free-radical polymerization, with the proviso that component (C) is not an olefin homopolymer, because use of that material, e.g. polyethylene, does not achieve the advantageous effects to the same extent.

A first preferred class is that of the rubbers known as ethylene-propylene (EPM) and ethylene-propylene-diene (EPDM) rubbers, which preferably have a ratio of ethylene units to propylene units in the range from 40:60 to 90:10.

The Mooney viscosities (MLI+4/100EC) (measured with the large rotor after a running time of 4 minutes at 100EC, according to DIN 53 523) of such, preferably not crosslinked, EPM or EPDM rubbers (gel contents generally below 1% by weight) are preferably in the range from 25 to 100, in particular from 35 to 90.

EPM rubbers generally have practically no remaining double bonds, whereas EPDM rubbers may have from 1 to 20 double bonds per 100 carbon atoms.

Examples of diene monomers $C_2$) for EPDM rubbers are conjugated dienes, such as isoprene and butadiene, non-conjugated dienes with from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadiene, cyclooctadiene and dicyclopentadiene, and also alkenylnorbornenes, such as 5-ethylidene-2-norbornene, 5-butylidene-2-norbornene, 2-methallyl-5-norbornene, 2-isopropenyl-5-norbornene, and tricyclodienes, such as 3-methyltricyclo[5.2.1.0$^{2,6}$]-3,8-decadiene or mixtures of these. Preference is given to 1,5-hexadiene, 5-ethylidenenorbornene and dicyclopentadiene. The diene content of the EPDM rubbers is preferably from 0.5 to 50% by weight, in particular from 2 to 20% by weight and particularly preferably from 3 to 15% by weight, based on the total weight of the olefin polymer.

EPM or EPDM rubbers may preferably also have been grafted with reactive carboxylic acids or derivatives of these. Particular mention may be made here of acrylic acid, methacrylic acid and derivatives of these, and also maleic anhydride.

Examples of particularly preferred components C) are MBS rubbers composed of: from 65 to 99% by weight of a core composed of $C_2$) from 90 to 100% by weight of a diene, and from 0 to 10% by weight of other crosslinkable monomers, and from 1 to 35% by weight of a shell composed of $C_7$) from 1 to 30% by weight of styrene or of unsaturated styrenes, or a mixture of these, and $C_8$) from 70 to 100% by weight of at least one unsaturated nitrile.

Suitable monomers $C_7$) are styrenes or substituted styrenes of the general formula I

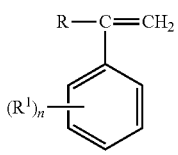

where R is a $C_1$-$C_8$-alkyl radical, preferably methyl or ethyl, or hydrogen, and $R^1$ is a $C_1$-$C_8$-alkyl radical, preferably methyl or ethyl, and n is 1, 2, or 3, or a mixture of these.

Another group of preferred olefin polymers is that of copolymers of α-olefins having from 2 to 8 carbon atoms, in particular of ethylene, with $C_1$-$C_{18}$-alkyl esters of acrylic acid and/or methacrylic acid.

In principle, any of the primary, secondary, or tertiary $C_1$-$C_{18}$-alkyl esters of acrylic acid or methacrylic acid is suitable, but preference is given to esters having from 1 to 12 carbon atoms, in particular having from 2 to 10 carbon atoms.

Examples of these are methyl, ethyl, propyl, n-butyl, isobutyl, tert-butyl, 2-ethylhexyl, octyl, and decyl (meth)acrylates. Among these, particular preference is given to n-butyl acrylate and 2-ethylhexyl acrylate.

The proportion of the methacrylic esters and acrylic esters $C_3$) in the olefin polymers is from 0 to 60% by weight, preferably from 10 to 50% by weight, and in particular from 30 to 45% by weight.

Other monomers which may be present instead of the esters $C_3$), or in addition to these, in the olefin polymers are monomers $C_4$) having acid functionality and/or having latent acid functionality, these being derived from ethylenically unsaturated mono- or dicarboxylic acids, or monomers $C_5$) containing epoxy groups.

Examples which may be mentioned of monomers $C_4$ are acrylic acid, methacrylic acid, tertiary alkyl esters of these acids, in particular tert-butyl acrylate, and dicarboxylic acids, such as maleic acid and fumaric acid, or derivatives of these acids, or else there monoesters.

Monomers having latent acid functionality are compounds which form free acid groups under the conditions of the polymerization process, or during incorporation of the olefin polymers into the molding compositions. Examples which may be mentioned of these are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The monomers having acid functionality or having latent acid functionality, and the monomers comprising epoxy groups, are preferably incorporated into the olefin polymers via addition of compounds of the general formulae I-IV to the monomer mixture.

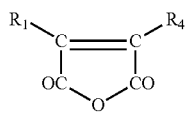

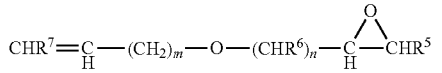

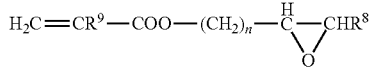

where the radicals $R^1$-$R^9$ are hydrogen or alkyl groups having from 1 to 6 carbon atoms, and m is a whole number from 0 to 20, and n is a whole number from 0 to 10.

$R^1$-$R^7$ are preferably hydrogen, m is preferably 0 or 1, and n is preferably 1. The corresponding compounds are maleic acid, fumaric acid, maleic anhydride, $C_4$), or alkenyl glycidyl ether or vinyl glycidyl ether $C_5$).

Preferred compounds of the formulae I, II, III, and IV are maleic acid and maleic anhydride as component $C_4$) and epoxy-comprising esters of acrylic acid and/or methacrylic acid, particular preference being given to glycidyl acrylate and glycidyl methacrylate (as component $C_5$).

The proportion of each of the components $C_4$) and $C_5$) is from 0.07 to 40% by weight, in particular from 0.1 to 20% by weight, and particularly preferably from 0.15 to 15% by weight, based on the total weight of the olefin polymers.

Particular preference is given to olefin polymers composed of from 50 to 98.9% by weight, in particular from 55 to 65% by weight, of ethylene, from 0.1 to 20% by weight, in particular from 0.15 to 10% by weight, of glycidyl acrylate and/or glycidyl methacrylate, acrylic acid, and/or maleic anhydride, from 1 to 45% by weight, in particular from 25 to 40% by weight, of n-butyl acrylate and/or 2-ethylhexyl acrylate, and from 0 to 10% by weight, in particular from 0.1 to 3% by weight, of maleic anhydride or fumaric acid, or a mixture of these.

Other preferred esters of acrylic and/or methacrylic acid are the methyl, ethyl, propyl, isobutyl, and tert-butyl esters.

Examples of other monomers $C_6$) which may be used are vinyl esters and vinyl ethers. If these olefin polymers are used, their proportion is preferably from 0 to 20% by weight, in particular from 4 to 18% by weight, and very particularly from 5 to 15% by weight, based on the total weight of components (A) to (D).

The ethylene copolymers described above may be prepared by processes known per se, preferably via random copolymerization at high pressure and at elevated temperature.

The melt index of the ethylene copolymers is generally in the range from 1 to 80 g/10 min (measured at 190° C. and 2.16 kg load).

Preference is also given to acrylate rubbers C) composed of:
a) from 70 to 90% by weight, preferably from 75 to 85% by weight, of crosslinked elastomeric core, composed of:
  1) from 20 to 90% by weight of a core composed of a copolymer (1) of an n-alkyl acrylate whose alkyl group has from 5 to 12 carbon atoms and preferably from 5 to 8 carbon atoms, or of a mixture of alkyl acrylates, where the number of the carbon atoms in straight-chain or branched alkyl groups is in the range from 2 to 12 and preferably from 4 to 8; of a polyfunctional crosslinking agent, where this molecule has unsaturated groups and, among these, at least one $CH_2$=C< group of vinyl type, and, if appropriate, is composed of a polyfunctional grafting agent, where this molecule has unsaturated groups and, among these, at least one $CH_2$=CH—$CH_2$— group of allyl type, where the core comprises a molar amount of the crosslinking agent and, if appropriate, of the grafting agent, of: from 0.05 to 5%, the amount preferably being from 0.5 to 1.5% by weight,
  2) from 80 to 10% by weight of a shell which is composed of a copolymer (II) of an n-alkyl acrylate whose alkyl group has from 4 to 12 carbon atoms and preferably from 4 to 8 carbon atoms, or of a mixture of alkyl acrylates as defined under 1), and of a polyfunctional grafting agent, where this molecule has unsaturated groups and, among these, at least one $CH_2$=CH—$CH_2$— group of allyl type, where the shell comprises a molar amount of from 0.05 to 2.5% of the grafting agent, the amount preferably being from 0.5 to 1.5% by weight, and
b) from 30 to 10% by weight, and preferably from 25 to 15% by weight, of a shell, grafted onto the core and composed of an alkyl methacrylate polymer whose alkyl group has from 1 to 4 carbon atoms, or composed of a random copolymer of an alkyl methacrylate whose alkyl group has from 1 to 4 carbon atoms with an alkyl acrylate whose alkyl group has from 1 to 8 carbon atoms, the molar amount present of the alkyl acrylate being from 5 to 40%, and preferably in the range from 10 to 20%.

By way of illustration of the n-alkyl acrylates which according to the invention may be used to form the copolymer (1), use may be made of n-pentyl acrylate, n-hexyl acrylate, n-heptyl acrylate, and in particular n-octyl acrylate.

Examples of n-alkyl acrylates which may be used according to the invention to form the copolymer (II) are n-butyl acrylate, n-pentyl acrylate, n-hexyl acrylate, n-heptyl acrylate, and in particular n-octyl acrylate.

The n-alkyl acrylates which may be used to form the copolymers (I) and/or (II) may be identical or different.

By way of illustration of the straight-chain or branched alkyl acrylates which may be used according to the invention to form the mixtures of alkyl acrylates in the copolymers (I) and/or (II), use may be made of ethyl acrylate, n-propyl acrylate, n-butyl acrylate, amyl acrylate, 2-methylbutyl acrylate, 2-ethylhexyl acrylate, n-hexyl acrylate, n-octyl acrylate, n-decyl acrylate, n-dodecyl acrylate, and 3,5,5-trimethylhexyl acrylate.

If a mixture of alkyl acrylates is used to form the copolymers (I) and/or (II), the proportion used of the n-alkyl acrylate should be at least 10% by weight of the mixture of alkyl acrylates, this amount preferably being in the range from 20 to 80%.

As stated above, identical or different mixtures of alkyl acrylates may be used to prepare the copolymers (I) and/or (II).

According to the present invention, it is preferable to use n-alkyl acrylates, and in particular n-octyl acrylate, to prepare the copolymers (I) and (II).

If a mixture of alkyl acrylates is used to form the copolymers (I) and/or (II), the amount used is preferably from 20 to 80% by weight of n-octyl acrylate and preferably from 80 to 20% by weight of n-butyl acrylate.

Examples of alkyl methacrylates which may be used according to the present invention to form the shell grafted onto the crosslinked elastomeric core are ethyl methacrylate, n-propyl methacrylate, isopropyl methacrylate; n-butyl methacrylate, isobutyl acrylate, and particularly methyl methacrylate.

The crosslinking agent used to form the copolymer (I) may according to the present invention be selected in particular from the derivatives which have at least two double bonds of vinyl type or have one or more double bonds of vinyl type and have at least one double bond of allyl type. It is preferable to use compounds whose molecules mainly comprise double bonds of vinyl type.

By way of illustration of these crosslinking agents, mention may be made of the divinylbenzenes, (meth)acrylates of polyalcohols, e.g. trimethylolpropane triacrylate, trimethylolpropane trimethacrylate, allyl acrylate, allyl methacrylate, diacrylates or methacrylates of alkylene glycols having from 2 to 10 carbon atoms in the alkylene chain, and in particular ethylene glycol diacrylate, ethylene glycol dimethacrylate, butane-1,4-diol diacrylate, butane-1,4-diol dimethacrylate, hexene-1,6-diol diacrylate, hexane-1,6-diol dimethacrylate, the diacrylate or dimethacrylate of a polyoxyalkylene glycol of the following formula:

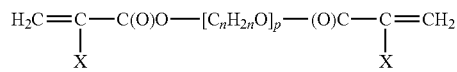

where X is hydrogen or methyl, n is a whole number from 2 to 4, and p is a whole number from 2 to 20, and in particular the diacrylate or dimethacrylate of polyoxyethylene glycol where the polyoxyethylene group has a molecular weight of about 400 (formula given above, where n=2 and p=9).

The grafting agent used for preparing the copolymer (II) may according to the present invention in particular be selected from the derivatives which comprise at least two double bonds of allyl type or comprise one or more double bonds of allyl type and comprise at least one double bond of vinyl type.

It is preferable to use compounds whose molecules mainly comprise double bonds of allyl type.

Examples of these grafting agents which may be used are diallyl maleate, diallyl itaconate, allyl acrylate, allyl methacrylate, triallyl cyanurate, triallyl isocyanurate, diallyl terephthalate, and triallyl trimesate.

The preferred proportion of the impact modifier introduced into the thermoplastic polymer is in the range from 1 to 30% by weight and preferably from 5 to 10% by weight, based on 100% by weight of the thermoplastic polymer used.

The molecular weight of the impact modifier may be assessed by defining a melt viscosity, which has the same range of variation. The melt viscosity may be within a fairly wide range, with the proviso that good dispersion of the impact modifier is ensured during the operations of use of the resin composition with the modifier. A suitable variable representing this melt viscosity is the value of the moment of resistance in a Brabender rheometer which comprises 50 g of impact modifier and is operated at a temperature of 200° C., the rotation rate of the rotors being 40 rpm, and the torque being determined at 200° C. after 20 min. Suitable values for the melt viscosity of the impact modifier correspond to values in the range from 600 to 4000 mg for the abovementioned torque. For resin compositions in which the thermoplastic polymer is a polymer with at least 80% by weight of polymerized vinyl chloride, the preferred values for the melt viscosity of the impact modifier correspond to torque values in the range in 800 to 3000 mg, and in particular from the range from 1000 to 2500 mg.

EP-A 776 915 discloses processes for the preparation of these components C).

As component D), the inventive molding compositions may comprise from 0 to 60% by weight, in particular up to 50% by weight, of additives and processing aids other than B) and C).

As component D), the inventive molding compositions may comprise from 0 to 5% by weight, preferably from 0.05 to 3% by weight, and in particular from 0.1 to 2% by weight, of at least one ester or amide of saturated or unsaturated aliphatic carboxylic acids having from 10 to 40, preferably from 16 to 22, carbon atoms with saturated aliphatic alcohols or amines having from 2 to 40, preferably from 2 to 6, carbon atoms.

The carboxylic acids may be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono-, di- or triamines. Examples of these are stearylamine, ethylenediamine, propylenediamine, hexamethylenediamine, di(6-aminohexyl) amine, particular preference being given to ethylenediamine and hexamethylenediamine. Correspondingly, preferred esters or amides are glyceryl distearate, glyceryl tristearate, ethylenediamine distearate, glyceryl monopalmitate, glyceryl trilaurate, glyceryl monobehenate, and pentaerythrityl tetrastearate.

It is also possible to use mixtures of various esters or amides, or esters with amides combined, the mixing ratio here being as desired.

Fibrous or particulate fillers D) which may be mentioned are carbon fibers, glass fibers, glass beads, amorphous silica, asbestos, calcium silicate, calcium metasilicate, magnesium carbonate, kaolin, chalk, powdered quartz, mica, barium sulfate, and feldspar, the amounts used of these being up to 50% by weight, in particular up to 40% by weight.

Preferred fibrous fillers which may be mentioned are carbon fibers, aramid fibers, and potassium titanate fibers, particular preference being given to glass fibers in the form of E glass. These may be the commercially available forms of chopped glass or rovings.

The fibrous fillers may have been surface-pretreated with a silane compound to improve compatibility with the thermoplastic.

Suitable silane compounds are those of the general formula

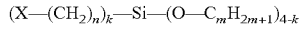

where the substituents are:

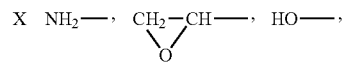

n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.05 to 5% by weight, preferably from 0.5 to 1.5% by weight, and in particular from 0.8 to 1% by weight (based on C).

Acicular mineral fillers are also suitable.

For the purposes of the invention, acicular mineral fillers are mineral fillers with very pronounced acicular character. An example which may be mentioned is acicular wollastonite. The L/D (length/diameter) ratio of the mineral is preferably from 8:1 to 35:1, with preference from 8:1 to 11:1. If appropriate, the mineral filler may have been pretreated with the abovementioned silane compounds; however, this pretreatment is not essential.

Other fillers which may be mentioned are kaolin, calcined kaolin, wollastonite, talc, and chalk.

As component D), the inventive thermoplastic molding compositions may comprise conventional processing aids, such as stabilizers, oxidation retardants, stabilizers to counter decomposition due to heat or due to ultraviolet light, lubricants, mold-release agents, colorants, such as dyes and pigments, nucleating agents, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc.

Other lubricants and mold-release agents are usually used in amounts of up to 1% by weight. Preference is given to long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), or calcium montanate or sodium montanate, or low-molecular-weight polyethylene waxes or low-molecular-weight polypropylene waxes.

Examples of plasticizers which may be mentioned are dioctyl phthalates, dibenzyl phthalates, butyl benzyl phthalates, hydrocarbon oils and N-(n-butyl)benzene-sulfonamide.

The inventive molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-containing ethylene polymers have homogeneous distribution in the molding compositions and preferably have a particle size $d_{50}$ (numeric average) in the range from 0.05 to 10 µm, in particular from 0.1 to 5 µm. These small particle sizes can particularly preferably be achieved by the use of aqueous dispersions of fluorine-containing ethylene polymers and the incorporation of these into a polyester melt.

The inventive thermoplastic molding compositions may be prepared by methods known per se, by mixing the starting components in conventional mixing apparatus, such as screw extruders, Brabender mixers or Banbury mixers, and then extruding them. The extrudate may be cooled and comminuted. It is also possible to premix individual components and then to add the remaining starting materials individually and/or likewise in a mixture. The mixing temperatures are generally from 230 to 290° C.

In another preferred method of operation, components B), and also, if appropriate, C)/D) may be mixed with a polyester prepolymer, compounded, and pelletized. The resultant pellets are then solid-phase-condensed, continuously or batchwise, under an inert gas, at a temperature below the melting point of component A) until the desired viscosity has been reached.

The inventive thermoplastic molding compositions feature good flowability together with good mechanical properties.

In particular, the processing of the individual components (without clumping or caking) is problem-free and possible in short cycle times, permitting in particular an application as thin-walled components.

The use for an improved-flow polyester can be applicable to almost any injection molding application. The improved flow permits use of a lower melt temperature and can therefore lead to a marked lowering of the entire cycle time for the injection molding process (lowering of the manufacturing costs for an injection molding!). The injection pressures needed during processing are moreover lower, therefore requiring less total locking force for the injection mold, and less capital expenditure on the injection molding machine.

Alongside the improvements in the injection molding process, the lowering of the melt viscosity can lead to marked advantages in the actual design of the molding. For example, injection molding can be used to produce thin-walled applications which, for example, could not hitherto be produced using filled polyester grades. Similarly, the use of reinforced but free-flowing polyester grades in existing applications can reduce wall thicknesses and therefore reduce component weights.

These materials are suitable for the production of fibers, foils, and moldings of any type, in particular for applications as plugs, switches, housing parts, housing covers, headlamp bezels, shower heads, fittings, smoothing irons, rotary switches, stove controls, fryer lids, door handles, (rear) mirror housings, tailgate screen wipers, sheathing for optical conductors.

Electrical and electronic applications which can be produced using the improved-flow polyesters are plugs, plug components, plug connectors, cable harness components, cable mounts, cable mount components, three-dimensionally injection-molded cable mounts, electrical connector elements, mechatronic components, and optoelectronic components.

Possible uses in automobile interiors are dashboards, steering column switches, seat components, headrests, center consoles, gearbox components, and door modules, and possible automobile exterior components are door handles, headlamp components, exterior mirror components, windshield washer components, windshield washer protective housings, grilles, roof rails, sunroof frames, and exterior bodywork parts.

Possible uses of the improved-flow polyester in the kitchen and household sector are production of components for kitchen equipment, e.g. fryers, smoothing irons, buttons, and also garden and leisure sector applications, such as components for irrigation systems or garden equipment.

In the medical technology sector, it becomes simpler to produce inhaler housings and components of these via improved-flow polyesters.

The morphology of selected compounded materials was studied via transmission electron micrographs. Good dispersion of the particles in the blend is seen. Particle sizes of from 20 to 500 nm were observed.

EXAMPLES

Component A/1:

Polybutylene terephthalate with a viscosity number VN of 130 ml/g and with a carboxy end group content of 34 meq/kg (Ultradur® B 4520 from BASF AG) (VN measured in 0.5% strength by weight solution of phenol/o-dichlorobenzene, 1:1 mixture, at 25° C.), comprising 0.65% by weight of pentaerythritol tetrastearate (component D1, based on 100% by weight of A)

Preparation Specification for Polycarbonates B1

General Operating Specification:

As shown in table 1, equimolar amounts of the polyhydric alcohol and diethyl carbonate were mixed in a three-necked flask equipped with stirrer, reflux condenser, and internal thermometer, and 250 ppm of catalyst (based on the amount of alcohol) were added. The mixture was then heated with stirring to 100° C., or in the experiment indicated by * to 140° C., and stirred for 2 h at this temperature. Evaporative cooling caused by the monoalcohol liberated reduced the temperature of the reaction mixture here as the reaction proceeded. The reflux condenser was now replaced by an inclined condenser, ethanol was removed by distillation, and the temperature of the reaction mixture was increased slowly to 160° C.

The ethanol removed by distillation was collected in a cooled round-bottomed flask, and weighed, and the conversion was thus determined as a percentage based on the full conversion theoretically possible (see table 1).

The reaction products were then analyzed by gel permeation chromatography, the eluent being dimethylacetamide and the standard being polymethyl methacrylate (PMMA).

TABLE 1

| Component | Alcohol | Catalyst | Distillate, amount of ethanol, based on complete conversion, mol % | Molar mass of product (g/mol) Mw Mn | Viscosity of product at 23° C. (mPas) | OH number of product (mg KOH/g) to DIN 53240, Part 2 |
|---|---|---|---|---|---|---|
| B1/1 | Glyc × EO 1:5 | K₂CO₃ | 90% | 8230 2898 | — | — |
| B1/2 | TMP × EO 1:3 | K₂CO₃ | 90% | 5907 2154 | 1810 | 300 |
| B1/3 | TMP/PO 1:1,2 | K₂CO₃ | 70% | 2136 1446 | 7200 | 461 |

TMP = Trimethylolpropane
Glyc = Glycerol
EO = Ethylene oxide
PO = Propylene oxide Component B2

TABLE 2

| | Monomers | Mn (g/mol) | Mw (g/mol) | OH number (mg KOH/g) | Acid number (mg KOH/g) |
|---|---|---|---|---|---|
| B 2 | Terephthalic acid and glycerol | 900 | 2390 | 416 | 0 |

Preparation of B2:

1589 g (8.19 mol) of dimethyl terephthalate and 628 g (6.83 mol) of glycerol were used as initial charge in a 5 l glass flask equipped with stirrer, internal thermometer, gas inlet tube, reflux condenser, and vacuum connection with cold trap. 4.4 g of di-n-butyltin oxide, commercially available as Fascat® 4201, were added, and the mixture was heated with the aid of an oil bath to an internal temperature of 140° C. A reduced pressure of 50 mbar was applied in order to remove water formed during the reaction. The reaction mixture was kept for 34 hours at the stated temperature and the stated pressure. It was then cooled to room temperature, giving 1750 g of hyperbranched polyester in the form of a clear, high-viscosity liquid. The analytical data are given in Table 2.

Component C
C/1) A copolymer composed of
  67% by weight of ethylene
  25% by weight of methyl methacrylate
  8% by weight of glycidyl methacrylate
  (Lotader® AX 8900 from Elf-Atochem)
C/2) An acrylate rubber with a crosslinked n-butyl acrylate core
  (Durastrength® 400 from Atofina)
C/3) A core-shell polymer composed of
  70% by weight of polybutadiene as core
  and, as shell,
  22.5% by weight of styrene and
  7.5% by weight of acrylonitrile
  (Blendex® 338 from General Electric)
C/4) An MBS rubber composed of
  82.6% by weight of polybutadiene as core
  and, as shell,
  15.1% by weight of methyl methacrylate
  2.3% by weight of acrylic acid/n-butyl acrylate
  (Paraloid® 6600 from Rohm & Haas)

Preparation of Molding Compositions

Components A) to C) were blended at from 250 to 260° C. in a twin-screw extruder and extruded into a water bath. After pelletization and drying, test specimens were injection molded and tested.

MVR was determined to ISO 1133, modulus of elasticity to ISO 527-2, Charpy impact resistance to ISO 179-2/1eU, and VN to DIN 53728 or ISO 1628.

The inventive compositions and the results of the measurements are given in the tables.

TABLE 3

| | Comparative table (without component B) | | | | | | | |
|---|---|---|---|---|---|---|---|---|
| Component | 1c | 2c | 3c | 4c | 5c | 6c | 7c | 8c |
| A/1 | 95 | 90 | 95 | 90 | 95 | 90 | 95 | 90 |
| C/1 | 5 | 10 | — | — | — | — | — | — |
| C/2 | — | — | 5 | 10 | — | — | — | — |
| C/3 | — | — | — | — | 5 | 10 | — | — |
| C/4 | — | — | — | — | — | — | 5 | 10 |
| VN [ml/g] | 123.0 | 131.4 | 118.1 | 113.9 | 117.0 | 112.5 | 118.9 | 117.5 |
| MVR [cm³/10 min] | 39.7 | 21.2 | 47 | 36 | 41.4 | 28.2 | 42.5 | 23.5 |
| Flow spiral [cm] | 33.8 | 31.6 | 35.2 | 33.3 | 35.2 | 33.8 | 35.3 | 33.7 |
| Modulus of elasticity [MPa] | 2390 | 2096 | 2443 | 2261 | 2406 | 2214 | 2328 | 2069 |
| Yield stress [MPa] | 52.50 | 46.13 | 53.69 | 49.65 | 53.04 | 48.67 | 51.12 | 44.59 |
| Tensile stress at break [%] | 22.77 | 23.42 | 21.91 | 24.88 | 15.17 | 19.60 | 14.60 | 20.76 |
| Tensile strain at yield [%] | 7.0 | 6.1 | 3.9 | 4.0 | 3.7 | 3.8 | 3.8 | 3.9 |

TABLE 4

Comparative table (without component B)

|  | 1c | 2c | 3c | 4c | 5c | 6c | 7c | 8c |
|---|---|---|---|---|---|---|---|---|
| A/1 | 95 | 90 | 95 | 90 | 95 | 90 | 95 | 90 |
| C/1 | 5 | 10 | — | — | — | — | — | — |
| C/2 | — | — | 5 | 10 | — | — | — | — |
| C/3 | — | — | — | — | 5 | 10 | — | — |
| C/4 | — | — | — | — | — | — | 5 | 10 |
| VN [ml/g] | 123.0 | 131.4 | 118 | 114 | 117 | 113 | 119 | 117.5 |
| MVR [cm³/10 min] | 39.7 | 21.2 | 47 | 36 | 41.4 | 28.2 | 42.5 | 23.5 |
| Flow spiral [cm] | 33.8 | 31.6 | 35.2 | 33.3 | 35.2 | 33.8 | 35.3 | 33.7 |
| Modulus of elasticity [MPa] | 2390 | 2096 | 2443 | 2261 | 2406 | 2214 | 2328 | 2069 |
| Yield stress [MPa] | 52.50 | 46.13 | 53.69 | 49.65 | 53.04 | 48.67 | 51.12 | 44.59 |
| Tensile stress at break [MPa] | 22.77 | 23.42 | 21.91 | 24.88 | 15.17 | 19.60 | 14.60 | 20.76 |
| Tensile strain at yield [%] | 7.0 | 6.1 | 3.9 | 4.0 | 3.7 | 3.8 | 3.8 | 3.9 |

TABLE 5

| Component [% by weight] | 1 | 2 | 3 | 4 | 5 | 6 | 7 | 8 | 9 | 10 | 11 |
|---|---|---|---|---|---|---|---|---|---|---|---|
| A1 | 94 | 89 | 94 | 89 | 94 | 89 | 94 | 89 | 78 | 77.25 | 77 |
| B1/1 | 1 | 1 | 1 | 1 | | | | | | | |
| B1/2 | | | | | 1 | 1 | 1 | 1 | | | |
| B1/3 | | | | | | | | | | 0.75 | 1 |
| C1 | 5 | 10 | | | 5 | 10 | | | | | |
| C2 | | | 5 | 10 | | | 5 | 10 | | | |
| C4 | | | | | | | | | 22 | 22 | 22 |
| VN [ml/g] | 105 | 112 | 108 | 106 | 112 | 114 | 109 | 111 | 96 | 87 | 85 |
| MVR [cm³/10 min] | 69.9 | 48.7 | 73.6 | 40.3 | 81.8 | 47.2 | 85.2 | 44.2 | 6.5 | 13.5 | 15.2 |
| Flow spiral [cm] | 44.8 | 42.9 | 44.2 | 36.3 | 46.4 | 39.4 | 45.1 | 38.2 | — | — | — |
| Modulus of elasticity [MPa] | 2382 | 2121 | 2427 | 2229 | 2403 | 2037 | 2430 | 2220 | 1653 | 1615 | 1590 |
| Yield stress [MPa] | 52.4 | 46.9 | 53.3 | 48.46 | 53.3 | 45.93 | 54.5 | 48.9 | 35.5 | 35.04 | 34.7 |
| Tensile stress at break [%] | 39.1 | 33 | 38.1 | 26.12 | 35.4 | 24.50 | 39.3 | 27 | 27.7 | 27.5 | 27.3 |
| Tensil strain at yield [%] | 7.4 | 5.8 | 4.1 | 3.9 | 6.9 | 6.1 | 4.1 | 4.1 | 4 | 4 | 4 |
| Impact resistance | 260 | NB | 186 | 221 | 246 | 292 | 271 | 281 | NB | NB | NB |
| Impact resistance 23° C., notched | 6.3 | 11.7 | 6.3 | 9.5 | 9.4 | 14.5 | 10.2 | 17.1 | — | — | — |

NB = no break

TABLE 6

| Component [% by weight] | 1 | 2 | 3 | 4 | 5 | 6 | 7 | 8 |
|---|---|---|---|---|---|---|---|---|
| A1 | 94 | 89 | 94 | 89 | 94 | 88 | 93 | 88 |
| B2 | 1 | 1 | 1 | 1 | 1 | 2 | 2 | 2 |
| C1 | 5 | 10 | | | 5 | 10 | | |
| C2 | | | 5 | 10 | | | 5 | 10 |
| VN [ml/g] | 118 | 124 | 116 | 114 | 113 | 117 | 112 | 110 |
| MVR [cm³/10 min] | 80.6 | 39.7 | 53.2 | 43.3 | 150 | 99.7 | 87.1 | 60 |
| Stress at max. [N/mm] | 53.86 | 47.3 | 54.6 | 50.1 | 55.6 | 48.8 | 55.7 | 50.9 |
| Tensile strain at break [%] | 12.6 | 16 | 22 | 16.3 | 10.3 | 9.7 | 14.4 | 12.9 |
| Tensile strain at yield [MPa] | 4.6 | 4.8 | 3.6 | 3.6 | 4.2 | 4.5 | 3.5 | 3.5 |
| Modulus of elasticity [MPa] | 2471 | 2149 | 2502 | 2294 | 2513 | 2179 | 2531 | 2333 |
| Impact resistance [kJ/m²] | 137 | 330 | 177 | 166 | 142 | 91 | 80 | 98.4 |
| Impact resistance, notched [kJ/m²] | 6 | 11.9 | 5.8 | 9.1 | 4.7 | 9.5 | 4.6 | 6.9 |
| Flow spiral [mm] | 42 | 37 | 37 | 34 | 50 | 47 | 44 | 39 |

The invention claimed is:

1. A thermoplastic molding composition, comprising
   A) from 10 to 98% by weight of at least one thermoplastic polyester,
   B) from 0.01 to 20% by weight of
      B1) at least one hyperbranched polycarbonate with an OH number of from 1 to 600 mg KOH/g of polycarbonate (to DIN 53240, Part 2), wherein B1) has a glass transition temperature Tg from −80° C. to 140° C. or
      B2) at least hyperbranched $A_xB_y$ polyester, wherein B2) has a glass transition temperature Tg from −50° C. to 140° C. or a mixture of B1) and B2),
      wherein $A_x$ and $B_y$ are different monomers and indices x and y are the number of functional groups present in A and B,
      wherein x is at least 1.1 and y is at least 2.1,
      wherein B2) has an OH number of from 0 to 600 mg KOH/g, and a COOH number of from 0 to 600 Mg KOH/g,
      wherein a degree of branching of both B1) and B2) is from 10 to 99.9%, and wherein B1) and B2) have both structural and molecular non-uniformity;
   C) from 1 to 40% by weight of an impact-modifying polymer,
   D) from 0 to 60% by weight of other additives, where the total of the percentages by weight of components A) to D) is 100%.

2. The thermoplastic molding composition according to claim 1, wherein the thermoplastic molding composition comprises component B1) and B1) has a number-average molar mass $M_n$ of from 100 to 15 000 g/mol.

3. The thermoplastic molding composition according to, claim 1, wherein the thermoplastic molding composition comprises component B1) and B1) has a viscosity (mPas) at 23° C. (to DIN 53019) of from 50 to 200 000.

4. The thermoplastic molding composition according to claim 1, wherein the thermoplastic molding composition comprises component B2) and B2) has a number-average molar mass $M_n$ of from 300 to 30 000 g/mol.

5. The thermoplastic molding composition according to claim 1, wherein the thermoplastic molding composition comprises components B1) and B2) and wherein the ratio of the components B1):B2) is from 1:20 to 20:1.

6. The thermoplastic molding composition according to claim 1, comprising, as component C), an MBS rubber comprising:
   from 65 to 99% by weight of a core comprising
      $C_2$) from 90 to 100% by weight of a diene,
   from 0 to 10% by weight of other crosslinkable monomers,
   and from 1 to 35% by weight of shell comprising
      $C_7$) from 0 to 30% by weight of styrene or of unsaturated styrenes, or a mixture of these,
   and
      $C_8$) from 70 to 100% by weight of at least one unsaturated nitrile.

7. The thermoplastic molding composition according to claim 1, comprising, as component C), an acrylate rubber comprising
   a) from 70 to 90% by weight of crosslinked elastomeric core, comprising:
      1) from 20 to 90% by weight of a core composed of a copolymer (1) of an n-alkyl acrylate whose alkyl group has from 5 to 12 carbon atoms or of a mixture of alkyl acrylates, where the number of the carbon atoms in straight-chain or branched alkyl groups is in the range from 2 to 12; of a polyfunctional crosslinking agent, where this molecule has unsaturated groups and, among these, at least one $CH_2=C$— group of vinyl type, and, optionally, is composed of a polyfunctional grafting agent, where this molecule has unsaturated groups and, among these, at least one $CH_2=CH-CH_2$— group of allyl type, where the core comprises a molar amount of the crosslinking agent and, optionally, of the grafting agent, of from 0.05 to 5%,
      2) from 80 to 10% by weight of a shell which is composed of a copolymer (II) of an n-alkyl acrylate whose alkyl group has from 4 to 12 carbon atoms or of a mixture of alkyl acrylates as defined under 1), and of a polyfunctional grafting agent, where this molecule has unsaturated groups and, among these, at least one $CH_2=CH-CH_2$— group of allyl type, where the shell comprises a molar amount of from 0.05 to 2.5% of the grafting agent and
   b) from 30 to 10% by weight of a shell, grafted onto the core and composed of an alkyl methacrylate polymer whose alkyl group has from 1 to 4 carbon atoms, or composed of a random copolymer of an alkyl methacrylate whose alkyl group has from 1 to 4 carbon atoms with an alkyl acrylate whose alkyl group has from 1 to 8 carbon atoms, the molar amount present of the alkyl acrylate being from 5 to 40%.

8. The thermoplastic molding composition according to claim 1, wherein the maximum amount of B) is 10% by weight.

9. The thermoplastic molding composition according to claim 1, wherein the degree of branching of both B1) and B2) is from 20 to 99%.

10. The thermoplastic molding composition according to claim 1, wherein the degree of branching of both B1) and B2) is from 20 to 95%.

11. The thermoplastic molding composition according to claim 1, comprising, as component (C), a copolymer comprising
   $C_1$) from 40 to 100% by weight of at least one α-olefin having from 2 to 8 carbon atoms,
   $C_2$) from 0 to 90% by weight of a diene,
   $C_3$) from 0 to 45% by weight of a $C_1$-$C_{12}$-alkyl ester of acrylic acid or methacrylic acid, or a mixture of these esters,
   $C_4$) from 0 to 40% by weight of an ethylenically unsaturated mono- or dicarboxylic acid, or of a functional derivative of this acid,
   $C_5$) from 0 to 40% by weight of a monomer comprising epoxy groups,
   $C_6$) from 0 to 5% by weight of other monomers capable of free-radical polymerization,
   with the proviso that component (C) is not an olefin homopolymer.

12. The thermoplastic molding composition according to claim 11, comprising, as component (C), a copolymer comprising
   $C_1$) from 55 to 79.5% by weight of at least one α-olefin having from 2 to 8 carbon atoms, $C_3$) from 20 to 40% by weight of a $C_1$-$C_{12}$-alkyl ester of acrylic or methacrylic acid, or a mixture of these esters,
   $C_4$) from 0.5 to 20% by weight of an ethylenically unsaturated mono- or dicarboxylic acid, or of a functional derivative of this acid,
   $C_5$) from 0 to 20% by weight of a monomer comprising epoxy groups.

13. The thermoplastic molding composition according to claim 1, Wherein the molding composition comprises component D) and wherein component D) is at least one selected from the group consisting of a processing aid, a stabilizer, an oxidation retardant, a heat stabilizer, an ultraviolet light stabilizer, a lubricant, a mold-release agent, a colorant, a dye, a pigment, a nucleating agent, a filler, and a plasticizer.

14. The thermoplastic molding composition according to claim 13, wherein component D) is at least one ester or amide of saturated or unsaturated aliphatic carboxylic acid having from 10 to 40 carbon atoms with saturated aliphatic alcohols or amines having from 2 to 40 carbon atoms.

15. The thermoplastic molding composition according to claim 13, wherein component D) is a fibrous or particular filler wherein the filler is at least one selected from the group consisting of carbon fiber, glass fiber, glass bead, amorphous silica, asbestos, calcium silicate, calcium metasilicate, magnesium carbonate, kaolin, chalk, powdered quartz, mica barium sulfate, feldspar, aramid fiber and potassium titanate fiber.

16. The thermoplastic molding composition according to claim 15, wherein the filler is surface-treated with a silane compound.

17. A method for the production of fibers, foils, or moldings comprising adding the thermoplastic molding composition as claimed in claim 1 to a fiber, foil or molding formulation.

18. A fiber, a foil, or a molding of any type obtainable from the thermoplastic molding compositions according to claim 1.

* * * * *